United States Patent [19]
Yang

[11] Patent Number: 5,782,578
[45] Date of Patent: Jul. 21, 1998

[54] HYDRAULIC TIMER MECHANISM FOR WATER IRRIGATION

[75] Inventor: Woody Yang, No. 205, Chung-Chuang Lane, Len-Li Tsune, Tien-Wei Hsiang, Changhua Hsien, Taiwan

[73] Assignees: Woody Yang; Shin-Tsung Yang; Sheh-Ching Young, all of Taipei, Taiwan

[21] Appl. No.: 609,385

[22] Filed: Mar. 1, 1996

[51] Int. Cl.⁶ .............................. B05B 1/14; B05B 3/14; E02B 13/00
[52] U.S. Cl. .................... 405/37; 239/41; 239/DIG. 1
[58] Field of Search ................. 405/36, 37; 239/240, 239/241, DIG. 1

[56] References Cited

U.S. PATENT DOCUMENTS

| | | | |
|---|---|---|---|
| 3,312,113 | 4/1967 | Martini | 239/241 X |
| 4,417,691 | 11/1983 | Lockwood | 239/DIG. 1 X |
| 4,501,391 | 2/1985 | Hunter | 239/DIG. 1 X |

*Primary Examiner*—Tamara L. Graysay
*Assistant Examiner*—Tara L. Mayo

*Attorney, Agent, or Firm*—Michael D. Bednarek; Kilpatrick Stockton LLP

[57] ABSTRACT

A hydraulic timer mechanism for water irrigation is disclosed to comprise a cylindrical body having an irrigation water entrance and a number of irrigation water exits. The water exits are arranged along the same peripheral circle of the cylindrical body. A water turbine assembly housed inside the cylindrical body for harnessing the power of irrigation water flow is employed to provide rotational power for the mechanism. A speed reduction device is coupled to the water turbine assembly for reducing the rotational speed and increasing the torque produced by the water turbine. A Geneva mechanism is coupled to the speed reduction device for transforming the continuous rotational motion of water turbine assembly into intermittent motion. An energy storage device is used for storing energy provided by the rotation of water turbine that is released in a short period of time. A rotating seat coupled to the Geneva mechanism provides for aligning the irrigation water entrance to one of the irrigation water exits one at a time as the intermittent motion means is driven for intermittent rotational motion. Subsequent irrigation water distribution is therefore provided to the multiple irrigation regions attached to the hydraulic timer mechanism.

6 Claims, 7 Drawing Sheets

1

HYDRAULIC TIMER MECHANISM FOR WATER IRRIGATION

BACKGROUND OF THE INVENTION

1. Field of The Invention

The present invention relates in general to a hydraulic timer mechanism. In particular, the present invention relates to a hydraulic timer mechanism for the timely control of irrigation water distribution.

2. Description of The Prior Art

Vast grass fields in places such as farms and golf courses require timely irrigation to maintain satisfactory grass conditions. Irrigation water is fluid whose flow is controlled utilizing valve devices such as pneumatically, hydraulically, or electrically-actuated valves. It is not uncommon to find large quantities of solid grains or other impurities in irrigation water that would eventually clog the valve for the distribution of irrigation water. This renders the reliability of these precision valves poorly dependable.

Open-gate valves may be used for the control of irrigation water distribution in flat and open locations. Since precision control mechanisms of these open-gate valves are not required to be submerged in irrigation water, there is therefore virtually no problem of clogging in their valve control mechanism. However, it is not always possible to find wide and flat locations to install this type of valve. Besides, in addition to the irrigation valve devices themselves, there are always more facilities such as irrigation pipelining, electric power lines, pneumatic pressure-supply lines and/or other hydraulic control pipelining passing through the site that complicate the situation and cause malfunctions. So far, automation in irrigation water control has been a problem.

SUMMARY OF THE INVENTION

It is therefore an object of the present invention to provide a hydraulic timer mechanism that provides timer irrigation water distribution to a number of irrigation regions without the requirement of additional control means.

The present invention further achieves the above-identified objects by providing a hydraulic timer mechanism for water irrigation. The mechanism comprises a cylindrical body having an irrigation water entrance and a number of irrigation water exits. The water exits are arranged along the same peripheral circle of the cylindrical body. A water turbine assembly housed inside the cylindrical body for harnessing the power of irrigation water flow is employed to provide rotational power for the mechanism. A speed reduction means is coupled to the water turbine assembly for reducing the rotational speed and increasing the torque produced by the water turbine. A Geneva mechanism is coupled to the speed reduction means for transforming the continuous rotational motion of water turbine assembly into intermittent motion. An energy storage means is used for storing energy provided by the rotation of water turbine that is released in a short period of time. A rotating seat coupled to the Geneva mechanism provides for aligning the irrigation water entrance to one of the irrigation water exits one at a time as the intermittent motion means is driven for intermittent rotational motion. Subsequent irrigation water distribution is therefore provided to the multiple irrigation regions attached to the hydraulic timer mechanism.

BRIEF DESCRIPTION OF THE DRAWINGS

Other objects, features, and advantages of the present invention will become apparent by way of the following detailed description of the preferred but non-limiting embodiments. The description is made with reference to the accompanied drawings in which.

DETAILED DESCRIPTION OF THE PREFERRED EMBODIMENT

Figure 1:
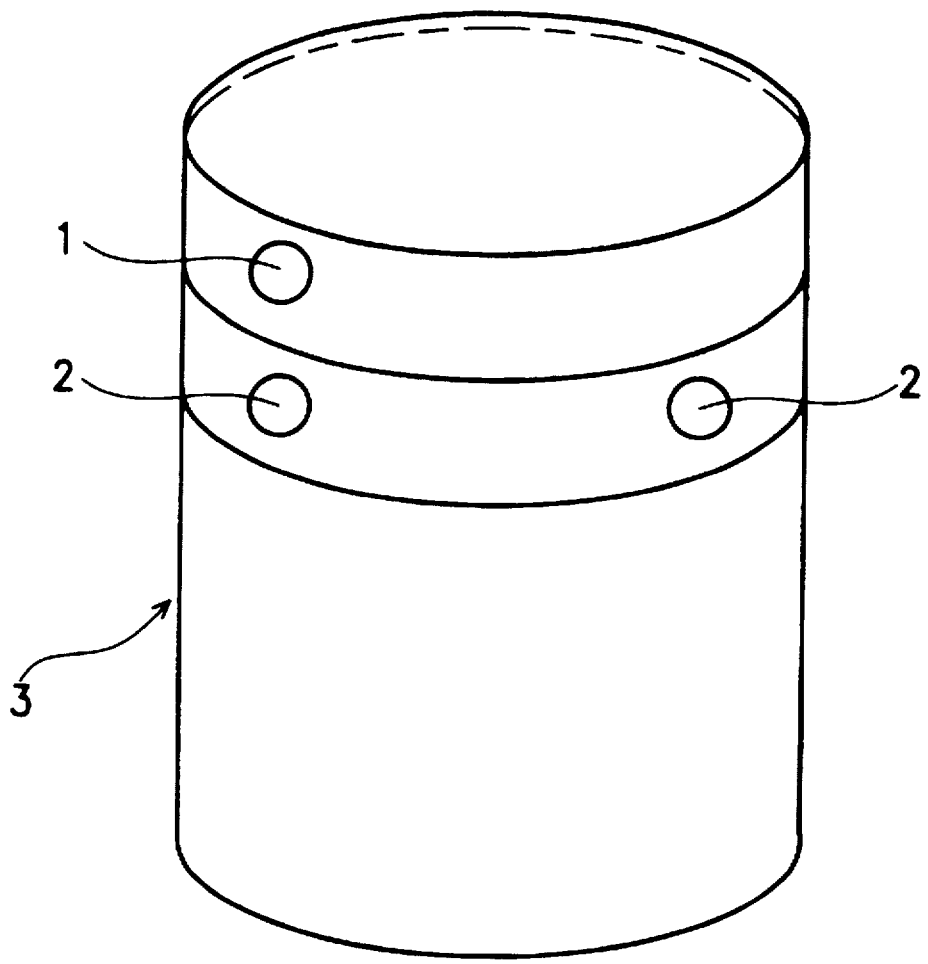
FIG. 1 shows the perspective view of the hydraulic timer mechanism in accordance with a preferred embodiment of the present invention.

Refer to FIG. 1 of the drawing. A perspective view of the hydraulic timer mechanism of the present invention is depicted in the drawing showing the general outline of the components of the timer mechanism. As is seen in the drawing, the hydraulic timer mechanism is exemplified to exhibit a generally cylindrical body 3 that has an entrance 1 and a number of exits 2.

The entrance 1 of the timer mechanism admits irrigation water coming from a water supply source. The incoming water is to be timely distributed by the timer mechanism via the multiple exits 2 to several irrigation regions connected to each of them through pipelines not shown in the drawing. The irrigation water exits may, for example, be arranged along the circular periphery of the body 3.

The irrigation water, which is normally supplied from a pressurized water supply device, for example, a water pump, will be routed to each of the irrigation water exits 2 one at a time and one after the other. The switching of the water supply from the entrance 1 to each of the exits 2 is controlled at a timed schedule under control of the hydraulic timer mechanism in a manner to be described below. In the depicted embodiment as shown in the accompanying drawing, it is assumed a total of four water exits 2 are arranged for the described mechanism, although only two are shown to be visible in the perspective view of FIG. 1.

Figure 2:
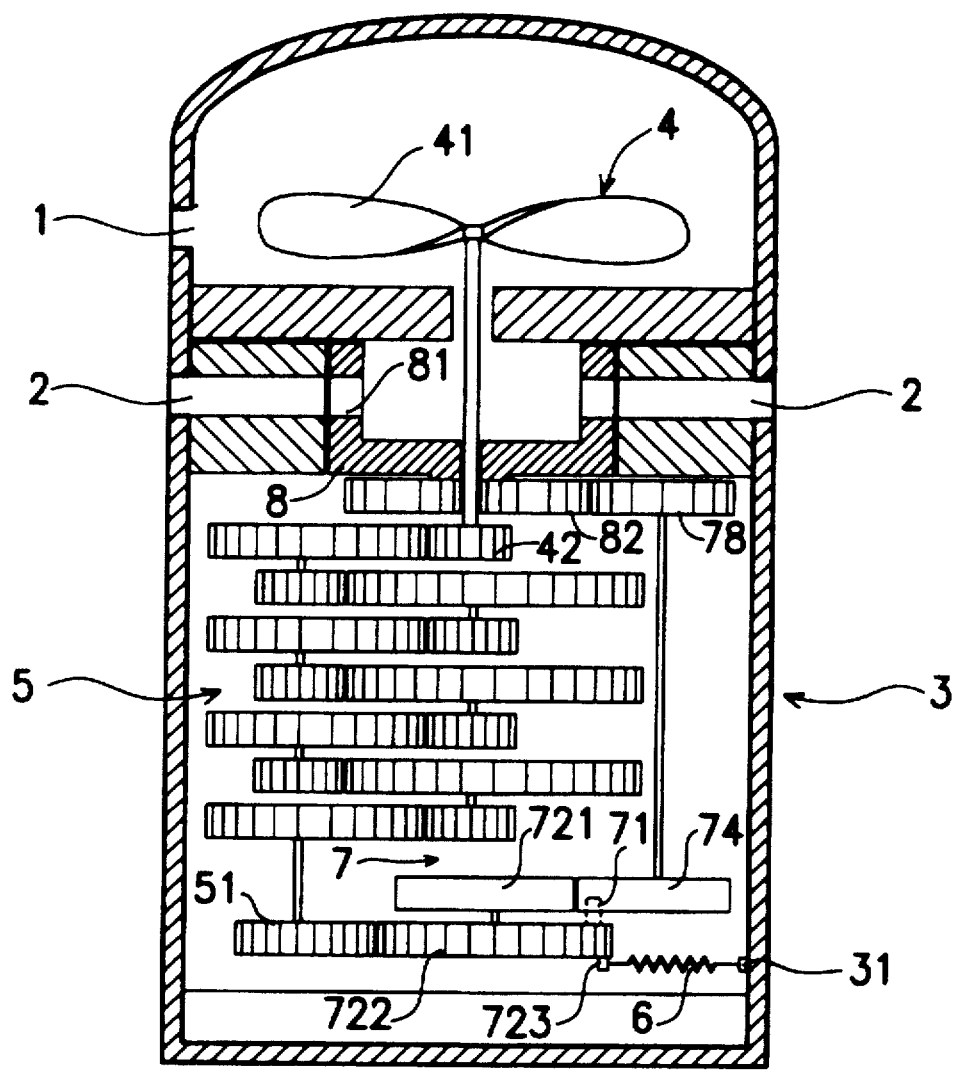
FIG. 2 shows a vertical cross-sectional view of the hydraulic timer mechanism of the preferred embodiment.

Refer next to FIG. 2, in which a cross-sectional view shows the internal configuration of the hydraulic timer mechanism of the present invention. The cross-sectional view of the timer mechanism is taken along a plane passing substantially through the longitudinal axis of the cylindrical body 3. As is seen in the drawing, the timer mechanism comprises a water turbine assembly 4, speed reduction gear assembly 5, spring 6, Geneva wheel assembly 7 and a rotating seat 8, all housed inside the cylindrical body 3.

The water turbine assembly 4 is consisted essentially of a number of two or more than two water turbine blades 41 at one end (the top end in the drawing) and a gear 42 at the other (the lower end). The water turbine assembly 4 is utilized to provide the power source to drive the entire hydraulic timer mechanism by harnessing water power from the pressurized supply water that is fed inside the mechanism via the entrance 1. The motive power is output to the rest portion of the entire mechanism via the gear 42 at the lower end of the water turbine assembly 4.

Output gear 42 of the water turbine assembly 4 is engaged with the input gear of the speed reduction gear assembly generally identified by reference numeral 5 in FIG. 2. At the output end of the speed reduction gear assembly 5, a Geneva wheel assembly 7 is coupled to receive the motive power transmitted thereto. Essentially, the driving power provided by the flow of irrigation water is passed from the water turbine blades 41 to the Geneva wheel assembly 7 via the speed reduction gear assembly 5. Speed reduction is necessary since the water turbine blades 41 must be rotating at its higher and suitable rotational speed that is by no means suitable for the operation of the Geneva wheel assembly 7, whose function is going to be described in detail below. The speed reduction gear assembly 5 also provides to increase the torque for the operation of the Geneva mechanism coupled thereto.

Figure 3:
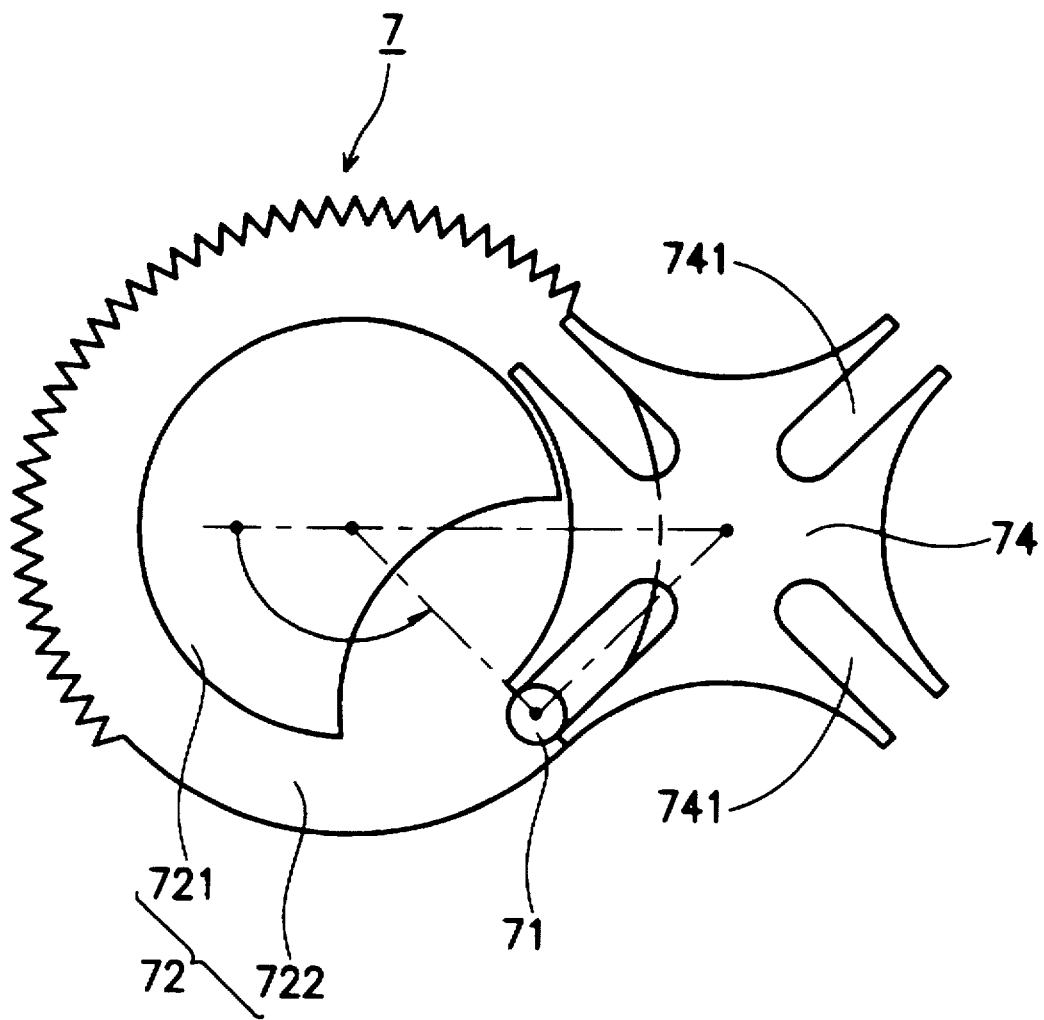
FIG. 3 shows the Geneva wheel assembly employed in the hydraulic timer mechanism of the preferred embodiment of the present invention.

Next, as is seen in FIG. 3, the Geneva wheel assembly 7 employed in the hydraulic timer mechanism comprises a master wheel 72 and a slave wheel 74. As is well known to persons skilled in the art, a Geneva wheel assembly serves to convert a continuous rotational motion (at the end of the master wheel 72) into an intermittent rotational one (at the end of the slave wheel 74). The master wheel 72 is itself comprised of two portions that are basically concentric disk-shaped parts stacked fixedly together with respect to each other, with one portion being the top wheel 721 and the other being the bottom wheel 722.

The top wheel 721 is essentially an incomplete circular disk with a peripheral portion thereof removed. Top wheel 721 therefore resembles the shape of an eroded moon as is seen in the drawing. On the other hand, the lower wheel 722 is more of a gear than the top wheel 721 itself, although only about half of its periphery is shaped into gear teeth. On the top surface of the lower wheel 722, a pin 71 is fixed vertically at a location near the edge. In this described embodiment, the master wheel 72 of the Geneva wheel assembly 7 has an integral structural configuration wherein the pin 71 is located near the edge of the lower wheel 722 that is substantially aligned with the line of symmetry of both the top and lower wheels 721 and 722. This is clearly shown in the top view of FIG. 3.

Slave wheel 74 of the Geneva wheel assembly 7 has four slots 741 formed as seen in the drawing. Each of the slots 741 has a longitudinal direction pointing toward the center of the slave wheel 74, and each of the slots 741 is spaced apart from its next slots at both sides by 90 degrees. The outer periphery of the slave wheel 74 is generally outlined by the four concave edges between each pair of two consecutive slots 741.

Each of the four concave edges of the slave wheel 74 has a radius of curvature slightly greater than the radius of the top wheel 721 of the master wheel 72. As is seen in FIG. 3, the master and slave wheels 72 and 74 of the Geneva wheel assembly 7 are each pivoted at their respective centers of rotation that allow the concave edges of the slave wheel 74 to smoothly receive the convex peripheral side surface of the top wheel 721 of the master wheel 72. Further, the width of each of the slots 741 of the slave wheel 74 is slightly larger than the diameter of the pin 71 protruding above the surface of the lower wheel 722 of the master wheel 72.

This arrangement allows pin 71 to be able to enter and slide smoothly inside each of the slots 741 as the master wheel 72 is driven to rotate and subsequently drives the slave wheel 74 to perform its rotation based on the well known Geneva wheel characteristics. In other words, one complete revolution of the master wheel 72 will drive the slave wheel 74 to advance one-fourth, that is, 90 degrees of a revolution.

Figure 4:
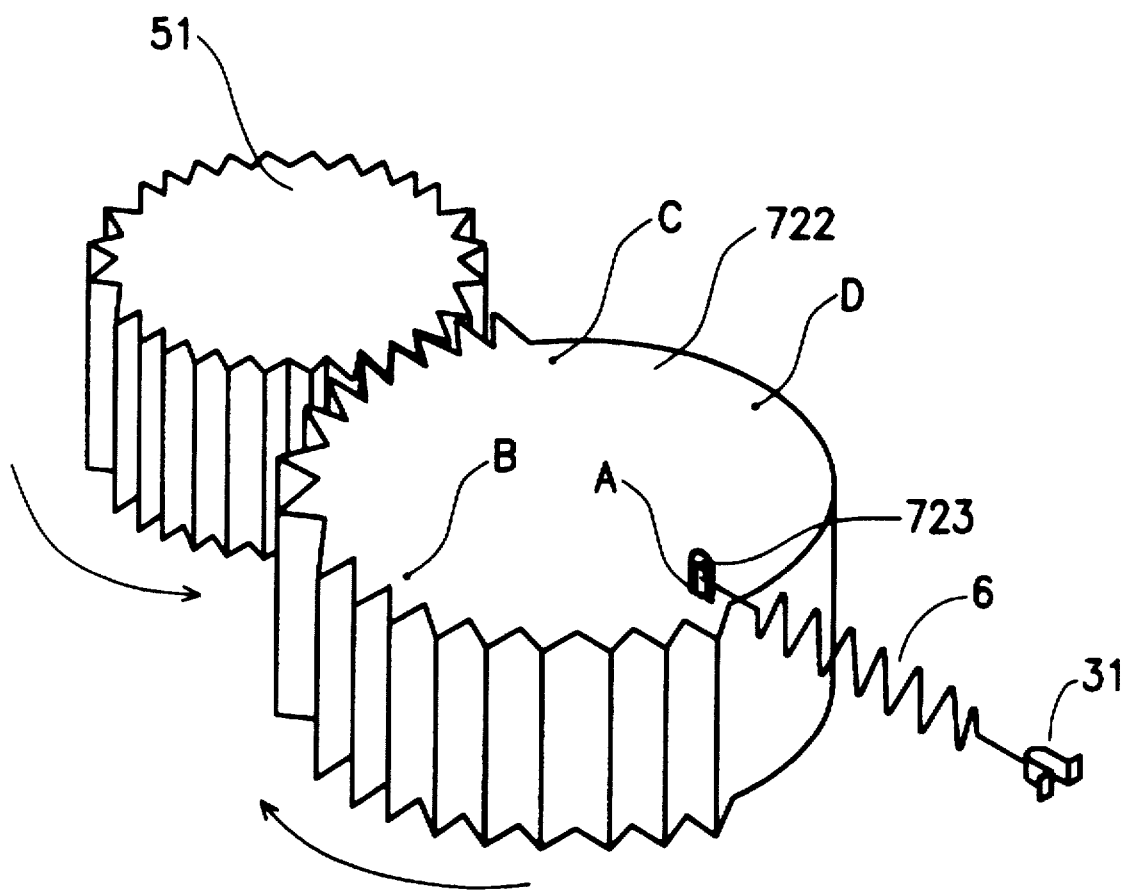
FIG. 4 is a perspective view showing the details of the bottom of the master wheel of the Geneva mechanism of the present rotated 180° as it is engaged to the driving power source.

Refer to FIG. 4 of the drawing. A perspective view shows the bottom of the lower wheel 722 of the master wheel 72 of the Geneva wheel assembly 7. Protruding from the bottom surface of the disk-shaped lower wheel 722 is a stud means 723 suitable for pivotally retaining one end of a spring means 6 as the lower wheel 722 is driven to rotate. The other end of the spring, which may, for example, be a helical coil spring, is fixed to the inner sidewall of the cylindrical body 3 of the timer mechanism via a hooking means 31.

In the drawing, the lower wheel 722 of the master wheel 72 of the Geneva wheel assembly 7 is seen to be driven by a gear 51 that is the output gear of the speed reduction gear train 5 described above. When the toothed periphery of the lower gear 722 is meshed with the teeth of the gear 51, the lower wheel 722 may be driven to rotate in a direction opposite the rotation of its driving gear 51, as is schematically shown in the drawing by the two opposing arrows. As the lower wheel 722 is driven to rotate in the clockwise direction, the location of the stud means 723 may be brought from its position identified by reference numeral A, passing through the location at B, and reach the location at C. In this arrangement, the spring 6 is stretched to its greatest length extent when the stud means 723 is brought to the C location.

Referring again to FIG. 2, wherein a rotating seat 8 is shown to be located between the water turbine blades 41 at one end of the water turbine assembly 4 and the gear 42 at the other end. The shaft that connects the water turbine blades 41 and the gear 41 is allowed to slidably pass through a center hole at the center of the rotating seat 8. The rotating seat 8 is substantially a cup-shaped device that has its top end opened to the flow of irrigation water coming inside the timer mechanism via the water entrance 1. At the sidewall of the cup-shaped rotating seat 8 is one opening 81 that can be rotated to the positions aligned with each one of the irrigation water exits 2. When aligned, the irrigation water is allowed to be dispatched to only the irrigation region that is pipelined to the very exit 2 that is aligned with the opening 81. The timed alignment of the respective exits 2 of the mechanism by the opening of the rotating seat 8 is described in detail below.

As is seen in the cross-sectional view of FIG. 2, the bottom surface of the rotating seat 8 is fixed to a gear 82, which is driven by another gear 78 that is the output gear of the Geneva mechanism described above by, for example, a connecting rod that is directly connected to the slave wheel 74 of the Geneva mechanism.

When the blades 41 of the water turbine assembly 4 are driven by the incoming irrigation water flow to drive the speed reduction gear assembly 5 that in turn drives the Geneva mechanism 7, the rotating seat 8 is also driven to rotate along. However, due to the motion characteristics of the Geneva mechanism, the continuous rotation of the water turbine 4 is only capable of intermittently driving the rotating seat 8 in its rotation.

As the lower wheel 722 of the master wheel 72 of the Geneva wheel assembly 7 is driven by the power source provided by the water turbine assembly 4 to rotate its first half of its one complete revolution, the protruding stud means 723 of FIG. 4 is brought to pass over the position C, which ensures that the wheel 722 will complete its rotation in the same clockwise direction of rotation when the gear teeth of the gear 51 runs out of meshing with the teeth of the lower wheel 722. The deformation energy stored in the spring means 6 during the process the spring is gradually stretched then assists in the conclusion of the other half turn of revolution of the wheel 722 as its gear is relieved out of meshing with the gear teeth of the gear 51. This second half of revolution is accomplished in a relatively faster speed than the first half due to the presence of the spring means 6.

As persons skilled in the art may well appreciate, the energy that provides for the driving of the second half of rotation may also be provided by else means other than the helical spring described above. For example, some form of weight that is raised in the first half of rotation may be used to provide for the driving of the second half of rotation as its potential energy is released.

In other words, while the first half of the revolution of the lower wheel 722 of the Geneva mechanism may take quite some time to complete, the second half is concluded in a matter of, for example, a fraction of a second. The time the master wheel 72 of the Geneva mechanism requires to finish the first half of its one revolution depends on the requirement concerning how long a period the water irrigation of one connected irrigation region is required to complete. This may range from several minutes to hours. The required time period may be achieved by the factor of gear reduction ratio provided by the speed reduction gear train 5 installed for the hydraulic timer irrigation mechanism.

It should be noted that one complete revolution of the master wheel 72 of the Geneva mechanism is corresponding to the advancement to a next irrigation water exit 2 for the timer mechanism of the present invention. In the depicted example of four water exits, a total of four complete revolutions in the master wheel 72 of the Geneva mechanism 7 is required to complete one irrigation cycle for all the irrigation regions attached to the hydraulic timer mechanism of the present invention. As persons skilled in the art may well appreciate, the number of timed irrigation exits 2 is not restricted to four as in the described embodiment. More or less of the number is achievable simply by an adjustment in the Geneva mechanism.

Figure 5:
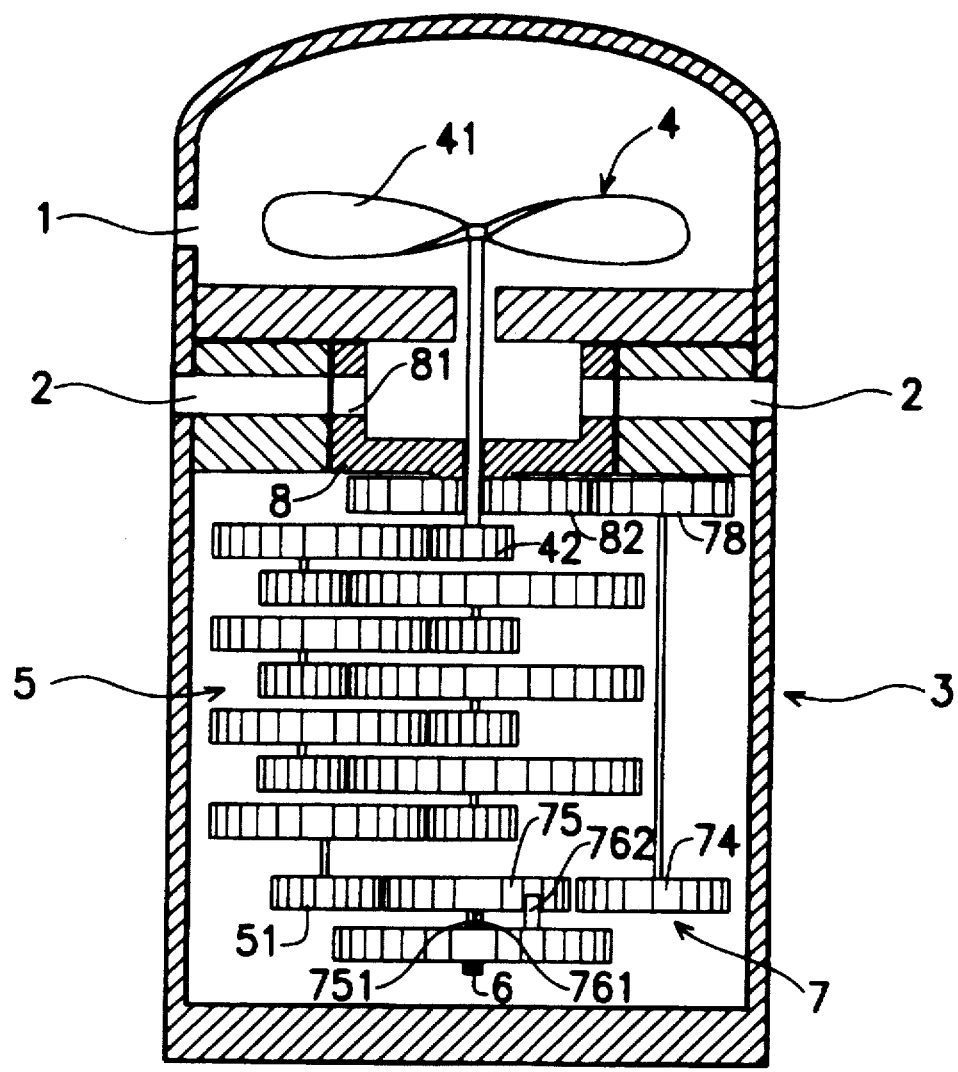
FIG. 5 shows a cross-sectional view of the hydraulic timer mechanism in accordance with another preferred embodiment of the present invention.
Figure 6:
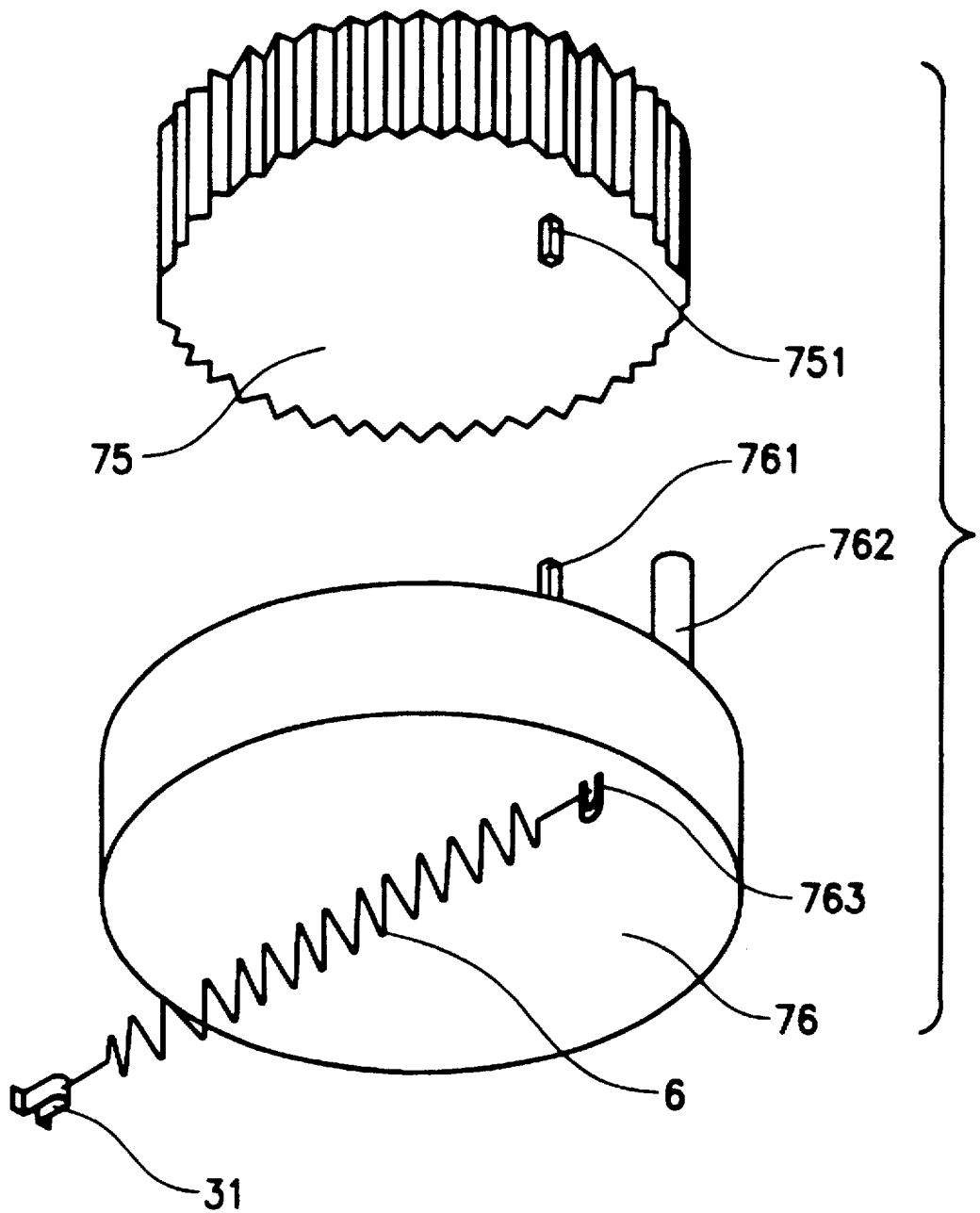
FIG. 6 is a perspective view showing the details of the bottom of the exploded master wheel of the Geneva mechanism for the second embodiment of FIG. 5 as it is engaged to the driving power source.
Figure 7:
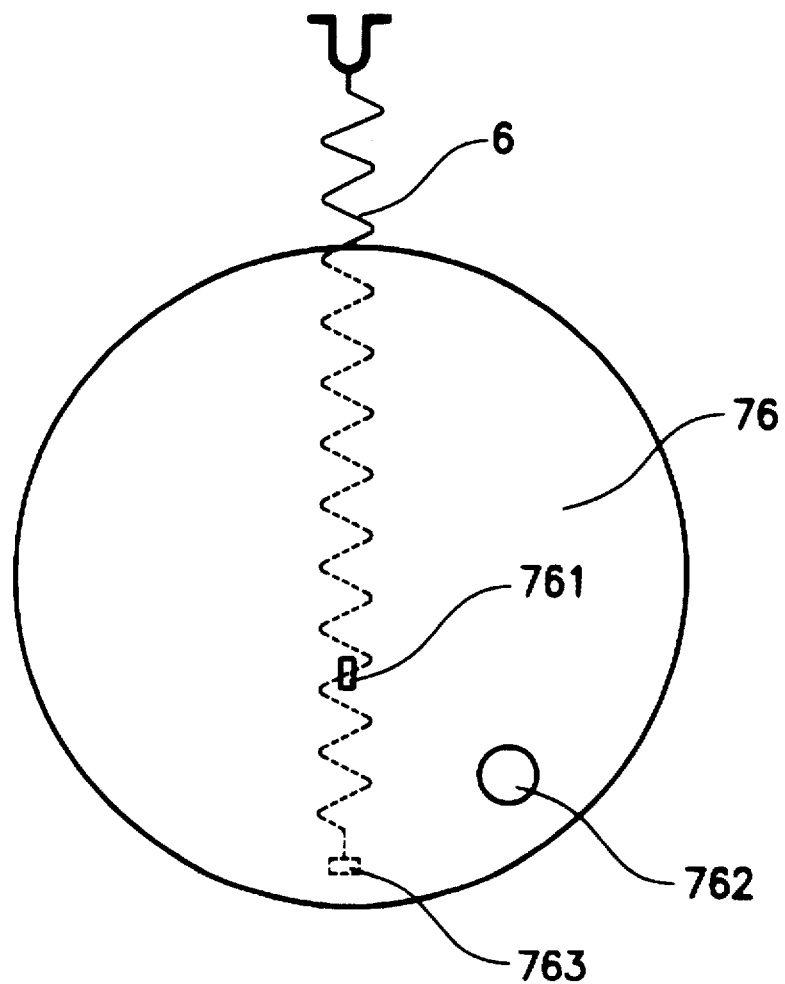
FIG. 7 shows the bottom view of the lower wheel of the master wheel of the Geneva mechanism for the second embodiment of FIG. 5.

Alternate design implementation of the Geneva mechanism is also possible. For example, FIG. 5 shows a cross-sectional view of the hydraulic timer mechanism in accordance with another preferred embodiment of the present invention, in which a different design of the mechanism that provides the Geneva motion is employed. In this embodiment, the master wheel of the Geneva mechanism 7 also comprises a pair of top and lower wheels 75 and 76 respectively. The slave wheel 74, however, is similar to the one employed in the first embodiment of the present invention (FIG. 3). Reference is then directed to FIG. 6. FIG. 6 is a perspective view showing the details of the bottom of the exploded master wheel of the Geneva mechanism for the second embodiment of FIG. 5 as it is engaged to the driving power source.

The top wheel 75 and the lower wheel 76 of the master wheel of the Geneva mechanism are pivoted at the same center axis for rotation. The top wheel 75 is essentially a gear wheel that is meshed with the output gear of the speed reduction gear assembly not shown in the drawing. A first protruding stud means 751 is fixed to the bottom surface thereof. The lower wheel 76 of the master wheel of the Geneva mechanism is, essentially, a round disk having a diameter larger than that of the top wheel 75. On the top surface of the lower wheel 76, there are provided a vertical pin 762 and a second protruding means stud 761.

Both the first protruding means 751 on the bottom surface of the top wheel 75 and the second protruding means 761 on the top surface of the lower wheel 76 are located on the same diametric distance from the center of rotation. The location of the pin 762 on the top surface of the lower wheel 76 is near to the edge that will not be engaging with the first protruding means 751 of the top wheel 75 when the two rotate with respect to each other. As was described above, the pin 762 is the engaging means for the slave wheel of the Geneva mechanism that will not be elaborated again.

As was similar in the case of the first described embodiment, a spring means 6 is attached to the Geneva mechanism utilizing similar arrangement of a protruding stud means 763. A spring hooking means 31 is also provided on the inner sidewall of the cylindrical body 3 not shown in the drawing.

When the power gear of the speed reduction gear train 5 drives the master wheel of the Geneva mechanism, the top wheel 75 will rotate, taking the first protruding means 751 along with its rotation, which may be placed in directed engagement with the second protruding means 761 of the lower wheel 76. The lower wheel 76 is thus also driven to rotate along. When the lower wheel 76 is driven to the extent exceeding half of its one revolution, the spring means 6 will forcibly pull the wheel 76 to conclude its second half of rotation in a fraction of a second of time. The pin 762 serves the purpose of engaging the slots of the slave wheel of the Geneva mechanism to provide the Geneva motion, which is again transferred via the gear 78 to switch the alignment of the opening 81 in the rotating seat 8. Timed irrigation water switching is thus achievable by use of this mechanism.

Similar Geneva motion can be provided for the hydraulic timer mechanism of the present invention which should be included in the scope of spirit of the present invention that is recited in the appended claims.

What is claimed is:

1. A hydraulic timer mechanism for water irrigation comprising:

a cylindrical body having an irrigation water entrance and a plurality of irrigation water exits, said exits being arranged along the same peripheral circle of said cylindrical body;

a water turbine assembly housed inside said cylindrical body for harnessing the power of irrigation water flow to provide rotational power;

a speed reducing gear assembly housed inside said cylindrical body and coupled to said water turbine assembly for reducing the rotational speed of said water turbine and increasing the torque produced by said water turbine assembly;

an intermittent motion device housed inside said cylindrical body and coupled to said speed reducing gear assembly for transforming the continuous rotational motion of said water turbine assembly into intermittent motion;

an energy storage means housed inside said cylindrical body for storing energy provided by the rotation of said water turbine assembly that is released in a short period of time; and a rotating seat housed inside said cylindrical body and coupled to said intermittent motion device for aligning said irrigation water entrance to one of said irrigation water exits one at a time as said intermittent motion device is driven for intermittent rotational motion.

2. The hydraulic timer mechanism of claim 1, wherein said speed reducing gear assembly is a speed reducing worm gear assembly.

3. A hydraulic timer mechanism of claim 1, wherein the energy storage means is a helical spring.

4. A hydraulic timer mechanism for water irrigation comprising:

- a cylindrical body having an irrigation water entrance and a plurality of irrigation water exits, said exits being arranged along the same peripheral circle of said cylindrical body;
- a water turbine assembly housed inside said cylindrical body for harnessing the power of irrigation water flow to provide rotational power;
- a speed reduction means housed inside said cylindrical body and coupled to said water turbine assembly for reducing the rotational speed of said water turbine and increasing the torque produced by said water turbine assembly;
- a Geneva wheel housed inside said cylindrical body and coupled to said speed reduction means for transforming the continuous rotational motion of said water turbine assembly into intermittent motion;
- an energy storage means housed inside said cylindrical body for storing energy provided by the rotation of said water turbine assembly that is released in a short period of time; and
- a rotating seat housed inside said cylindrical body and coupled to said Geneva wheel for aligning said irrigation water entrance to one of said irrigation water exits one at a time as said Geneva wheel is driven for intermittent rotational motion.

5. The hydraulic timer mechanism of claim 4, wherein said speed reduction means is a speed reducing gear assembly.

6. A hydraulic timer mechanism of claim 4, wherein the energy storage means is a helical spring.

* * * * *